(12) United States Patent
Kelnhofer (10) Patent No.: US 7,222,819 B1
(45) Date of Patent: May 29, 2007

(54) AIRCRAFT RAM AIR INLET WITH MULTI-MEMBER CLOSURE FLAP

(75) Inventor: Juergen Kelnhofer, Jork (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/910,260

(22) Filed: Aug. 2, 2004

(30) Foreign Application Priority Data

Aug. 2, 2003 (DE) ................. 103 35 482

(51) Int. Cl.
*B64D 33/02* (2006.01)

(52) U.S. Cl. .................................... 244/53 B

(58) Field of Classification Search ............ 244/199.4, 244/208, 209, 210–212, 213–217, 53 B, 244/99.11, 99.2, 99.3, 123.1, 129.4, 130, 244/12.6, 119.4, 30; 60/751, 587, 917
See application file for complete search history.

(56) References Cited

U.S. PATENT DOCUMENTS

| | | | | |
|---|---|---|---|---|
| 1,549,122 A | * | 8/1925 | Lanier ........................ | 244/204 |
| 1,559,091 A | * | 10/1925 | Hall ............................ | 244/212 |
| 1,723,778 A | * | 8/1929 | Hall ............................ | 244/212 |
| 1,793,702 A | * | 2/1931 | Ksoll .......................... | 244/212 |
| 1,810,693 A | * | 6/1931 | Alfaro ........................ | 244/211 |
| 1,818,322 A | * | 8/1931 | Hall ............................ | 244/204 |
| 1,843,993 A | * | 2/1932 | Stalker ....................... | 244/208 |
| 1,943,233 A | | 1/1934 | Beard | |
| 2,069,047 A | * | 1/1937 | Ray ............................ | 244/8 |
| 2,321,837 A | * | 6/1943 | Makwell .................... | 244/211 |
| 2,609,168 A | * | 9/1952 | McNally .................... | 244/113 |
| 2,885,162 A | * | 5/1959 | Griswold, II .............. | 244/207 |
| 3,010,680 A | * | 11/1961 | Kaplan ....................... | 244/207 |
| 3,262,657 A | * | 7/1966 | Anker-Holth ............. | 244/23 B |

(Continued)

FOREIGN PATENT DOCUMENTS

DE 3407137 8/1985

(Continued)

OTHER PUBLICATIONS

"Stepper motor." Wikipedia, The Free Encyclopedia. Jan. 17, 2003, 12:18 UTC. Wikimedia Foundation, Inc. Jul. 24, 2006 <http://en.wikipedia.org/w/index.php?title=Stepper_motor&oldid=63770018>.*

*Primary Examiner*—Robert P. Swiatek
*Assistant Examiner*—Stephen A Holzen
(74) *Attorney, Agent, or Firm*—W. F. Fasse; W. G. Fasse (57) ABSTRACT

A ram air inlet includes a channel with an intake in a wing leading edge, front and rear flaps arranged in the channel for selectively closing or opening the channel, and an actuator connected to the flaps. A front end of the front flap is pivotably connected by a fixed bearing to an aircraft structure adjacent the intake. A rear end of the rear flap is moveably and pivotably mounted to the aircraft structure via a movable bearing arrangement, e.g. a pivot bearing linearly movable in guide tracks, or a flexible lever connected to a fixed pivot bearing, or a swinging bearing pivotably connected to a fixed bearing. The opposite ends of the flaps are pivotably connected to each other by a third bearing. The actuator drives the third bearing to pivot the front flap between opened and closed positions, while the rear flap pivots and moves in the wing chord and/or thickness directions.

35 Claims, 5 Drawing Sheets

U.S. PATENT DOCUMENTS

| | | | | |
|---|---|---|---|---|
| 3,347,496 A | * | 10/1967 | Opfer, Jr. | 244/53 B |
| 3,493,196 A | * | 2/1970 | McCall | 244/216 |
| 3,524,458 A | * | 8/1970 | Goldsmith | 137/15.1 |
| 3,667,703 A | | 6/1972 | Boek | |
| 4,174,083 A | | 11/1979 | Mohn | |
| 4,307,743 A | | 12/1981 | Dunn | |
| 4,372,505 A | * | 2/1983 | Syberg | 244/53 B |
| 4,397,431 A | | 8/1983 | Ben-Porat | |
| 4,406,433 A | * | 9/1983 | Radkey et al. | 244/145 |
| 4,418,708 A | * | 12/1983 | Schulze et al. | 137/15.2 |
| 4,418,879 A | | 12/1983 | Vanderleest | |
| 4,456,204 A | * | 6/1984 | Hapke | 244/53 R |
| 4,655,413 A | | 4/1987 | Genssler et al. | |
| 4,962,903 A | * | 10/1990 | Byron | 244/117 A |
| 4,999,994 A | | 3/1991 | Rued et al. | |
| 5,026,004 A | * | 6/1991 | Dobie et al. | 244/53 B |
| 5,284,012 A | | 2/1994 | Laborie et al. | |
| 6,050,527 A | * | 4/2000 | Hebert et al. | 244/210 |
| 6,293,494 B1 | | 9/2001 | Scherer et al. | |
| 6,390,414 B1 | * | 5/2002 | Medvedev | 244/53 B |
| 6,464,171 B2 | * | 10/2002 | Ruffin | 244/130 |
| 6,729,156 B2 | | 5/2004 | Sauterleute et al. | |
| 6,901,737 B2 | | 6/2005 | Schnoor | |
| 2005/0211849 A1 | * | 9/2005 | Rouyre | 244/129.4 |

FOREIGN PATENT DOCUMENTS

| | | |
|---|---|---|
| EP | 1 251 069 | 10/2002 |
| FR | 747 754 | 6/1933 |
| FR | 765 564 | 6/1934 |
| FR | 1 055 264 | 2/1954 |

* cited by examiner

AIRCRAFT RAM AIR INLET WITH MULTI-MEMBER CLOSURE FLAP

PRIORITY CLAIM

This application is based on and claims the priority under 35 U.S.C. §119 of German Patent Application 103 35 482.4, filed on Aug. 2, 2003, the entire disclosure of which is incorporated herein by reference.

FIELD OF THE INVENTION

The invention relates to a ram air inlet or intake arrangement of an aircraft, including a ram air channel with an intake opening, and a flap arrangement to selectively open or close the air intake opening.

BACKGROUND INFORMATION

Conventional passenger transport aircraft typically include an air conditioning system including one or more air conditioning plants or packs, commonly based on an air cycle process, in which highly compressed process air, namely bleed air from a propulsion engine or an auxiliary power unit (APU) engine, is compressed and expanded, while being cooled by heat exchange at one or more stages. Through this air cycle, the process air is cooled and dehumidified. The cooling of the process air through a heat exchanger during the air cycle may, among other things, be carried out in a main or primary heat exchanger operating as a ram air heat exchanger. In this regard, cooler ambient air from the outside environment surrounding the aircraft flows through one set of passages of this heat exchanger, while removing heat from the hot process air that flows through the other set of passages of this heat exchanger. This cool ambient air is typically ram air entering a ram air intake and flowing through a ram air channel to the main or primary heat exchanger. The ram air intake is typically arranged on the outside fuselage at a location exhibiting an increased ram or stagnation air pressure due to the apparent incident wind of the oncoming air during flight of the aircraft. After passing through the heat exchanger, the ram air is then exhausted through an outlet channel that exits the aircraft fuselage at an area of relatively lower pressure in comparison to the stagnation or ram pressure existing at the ram air intake.

In many conventional aircraft types, the air conditioning packs are installed in the lower portion of the aircraft fuselage, or particularly in the area of the so called "belly fairing", such as in the Airbus A319, A320, A321, A330 and A340 aircraft. To provide the cooling ram air to the air conditioning packs located in the belly fairing, these aircraft typically include ram air inlets or intake openings in the lower belly area of the aircraft fuselage.

In the planning and construction of aircraft, it is desired or intended to move the air conditioning packs from the location in the belly fairing to a location at the sides of the interior of the fuselage, near the wing roots. Especially with such a location of the air conditioning packs, the previously existing location of ram air inlets is not optimal, for example due to long ram air channels that would be required. There is thus a need to provide an arrangement of ram air inlets at exterior locations of the aircraft subjected to the highest stagnation or ram air pressure of the outside ambient air during flight of the aircraft, while also achieving the shortest and most direct configuration of the ram air channels leading to the air conditioning pack heat exchangers, in order to reduce the overall weight, while increasing the cooling efficiency and the maximum cooling capacity of the air conditioning system. However, on the other hand, a location and configuration of the ram air inlets must ensure that the overall aerodynamic resistance, e.g. the total coefficient of drag, of the aircraft is not significantly increased by these ram air inlets.

It is further known to provide inlet closure flaps for selectively opening or closing the ram air intake openings so as to control the inlet flow of ram air. For example, in the Airbus A320 aircraft, it is known to arrange only a single individual inlet flap in the ram air intake. On the other hand, in the Airbus A330 and A340 aircraft, it is known to provide both an inlet flap and an outlet flap for controlling the flow of the ram air.

It has been found that the existing ram air inlet flap arrangements still leave room for improvement, i.e. for optimizing the airflow control and flow characteristics of the ram air through the air intake channel, as well as the total air resistance or drag generated by the air inlet arrangement in the open position, the closed position, and any intermediate position.

SUMMARY OF THE INVENTION

In view of the above it is an object of the invention to provide a ram air inlet arrangement for an aircraft, of which the intake opening is let into the outer contour of a lifting wing structure, and which has an inlet flap arrangement that achieves improved or optimized airflow of the ram air through the ram air channel in open or partially open positions of the flap arrangement, and improved or optimized airflow of the outside ambient air over the wing, so as to avoid any negative influence on the aerodynamics or especially the total aerodynamic resistance of the lifting wing. The invention further aims to avoid or overcome the disadvantages of the prior art, and to achieve additional advantages, as apparent from the present specification. The attainment of these objects is, however, not a required limitation of the claimed invention.

The above objects have been achieved according to the invention, in an aircraft including an aircraft fuselage and lifting wings connected to the fuselage, as well as a ram air intake arrangement including a ram air inlet at the upstream end of a ram air channel extending inside the aircraft. The invention especially provides an improved ram air inlet arrangement in which the air intake opening is let into the outer contour of the leading edge of the lifting wing of the aircraft, and the ram air channel extends from the air intake opening along or substantially parallel to a wing profile chord of the wing, in a direction of the wing chord or depth thereof. "Substantially parallel" means within an angular range around parallel, for example up to the sweepback angle of the wing, or as another example within +/−20° of parallel to the wing chord.

The ram air inlet arrangement further comprises a closure flap arrangement supported in the inlet channel on plural rotation or pivot bearings that each respectively have a bearing axis or pivot axis extending in the wing span direction, whereby the closure flap arrangement is pivotable about the pivot axes defined by these bearings. The arrangement further comprises an actuating mechanism, which includes an actuator and/or a spring, that is connected through a drive linkage to the ram air inlet flap arrangement so as to selectively close, partially open, or fully open the air intake opening with the flap arrangement.

Preferably, the ram air inlet flap arrangement includes a front flap and a rear flap that are movably supported and connected to each other via the above mentioned bearings. A first bearing is a fixed bearing that pivotably supports the front flap at a fixed location. A second bearing may be a fixed or movable bearing that pivotably supports the rear flap at a fixed or movable location. Preferably, the second bearing is a constrained or guided movable bearing, e.g. a linearly movable bearing, that can move linearly along one or more guide tracks in the wing chord or depth direction. The third bearing is a movable bearing that pivotably interconnects the front flap with the rear flap along a pivot axis that is movable in both the wing chord or depth direction and the wing height or thickness direction. Also, the drive linkage or transmission mechanism of the actuating mechanism is preferably connected to the third bearing, so as to apply the flap opening and closing drive actuation to this bearing.

Further preferably according to the invention, the front flap is outwardly convexly curved with a curvature matching the contour curvature of the sectional profile of the leading edge of the wing, while the rear flap is substantially flat or planar. With this arrangement, the front flap can be actuated to close the air intake opening, while providing a substantially flush and uninterrupted outer aerodynamic contour of the leading edge of the wing. This achieves a low disruption of the optimized aerodynamic contour of the leading edge of the wing, and thus does not produce any significant increase of the overall air resistance, and does not cause any significant airflow disturbance, separation, or turbulence of the incident airflow forming one or more boundary layers over the leading edge of the wing. On the other hand, when the flap arrangement is partially opened, the combination of the front flap and the rear flap joined to each other at the third bearing forms a constricted throat with a nozzle-like cross section of the open passage of the ram air channel. This achieves an efficient control of the airflow of the ram air through the channel. Finally, in a completely open position, the front and rear flaps can be completely contracted from the open flow cross-section of the air channel, to allow unobstructed airflow therethrough, or can still provide a slight nozzle effect by forming a slightly narrower smoothly confined nozzle throat or constriction.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED
EXAMPLE EMBODIMENTS AND OF THE
BEST MODE OF THE INVENTION

The drawings schematically illustrate several example embodiments of a ram air inlet or intake arrangement according to the invention, of which the air intake opening 14 is let into the outer contour of the leading edge 12 of a lifting wing 1 of an aircraft. This location is selected because the incident airflow of ambient air 19 surrounding the wing 1 forming a ram airflow 18 will develop the maximum stagnation or ram air pressure along the curved nose of the leading edge 12 of the lifting wing 1 during flight of the aircraft. Thus, the selected location of the air intake opening 14 is preferably the optimum ram or stagnation point on the wing leading edge 12. By moving the ram air intake opening from the conventional location in the belly fairing to the leading edge of the wing, this frees additional space in the belly fairing for other systems. The flap arrangement as described in detail below is very simple, and the length of the ram air channel 2 can be reduced to a minimum, whereby the total weight of the arrangement is also significantly reduced.

The air intake opening 14 is at the upstream end of a ram air channel or duct 2 that extends rearwardly from the opening 14 into the wing structure 22 of the wing 1, substantially in the wing chord or depth direction t along or substantially parallel to a profile chord 23 of the wing. For example, the ram air channel 2 preferably extends parallel to the airflow direction of the incident wind of the ram air 18. The ram air channel 2 preferably has a channel height in the wing height or thickness d direction that increases slightly from the air intake opening 14 rearwardly in an expanding front end portion of the channel 2, until it reaches a maximum height that is then maintained substantially uniformly along the rest of the length of the channel 2. The width of the channel in the wing span s direction is not visible in the present drawings, but may have a uniform continuous width or may expand similarly as the expansion in the height direction. The top of the channel is bounded by a channel ceiling 20; and the bottom of the channel is bounded by a channel floor 21. For example, the channel ceiling 20 and the channel floor 21 may each exhibit a kink or slight bend that extends along a line parallel a wing span s direction at the transition from the expanding portion to the uniform-height portion of the ram air channel 2. The height and width dimensions define an open channel cross-section 15 of the channel 2.

The ram air channel 2, e.g. the channel ceiling 20 and the channel floor 21 thereof as well as the sidewalls thereof (not shown), may be constructed as a massive metal component, e.g. a solid-walled pipe or duct or channel within and secured to the aircraft wing structure 22. As mentioned above, the channel ceiling 20 of this air channel or duct 2 may have a recess or even an opening to accommodate the flap 13 (and a movable third bearing 16 as discussed below) therein or moving therethrough.

The ram air channel 2 extends and is connected to a ram air heat exchanger 9 such as a main or primary heat exchanger of an air conditioning pack, which may be installed near the root of the wing 1 where it joins the fuselage of the aircraft. After passing through the ram air heat exchanger 9, and thereby extracting heat from the air cycle process air flowing through the heat exchanger 9, the ram outlet air 18A continues through an air outlet channel 10 to be returned back to the ambient environment 19 surrounding the aircraft, for example at an air outlet located at a lower pressure location on the outer skin of the aircraft, in comparison to the ram air inlet 14. For example, the air outlet can be arranged at a lower pressure area of the outer skin of the lifting wing 1.

In view of these further features of the ram air channel and the like, the location of the ram air opening 14 in the leading edge 12 of the wing also aims to achieve a short total ram air channel length serving the heat exchanger 9 of the air conditioning pack. Thus, such a position of a ram air intake opening 14 is advantageous in connection with the location of an air conditioning pack near the wing root, but would not be as advantageous for supplying ram air to an air conditioning pack located in the aircraft belly fairing on the bottom or belly of the aircraft fuselage, due to the resulting long length of the required air channel.

The ram air intake arrangement according to the invention further includes a ram air inlet flap 13 that is especially embodied as a flap assembly or flap arrangement 13 including a front inlet flap 3 and a rear inlet flap 4 that are respectively pivotably supported by a first bearing 16A and a second bearing 16B, and that are pivotably connected to each other by a third bearing 16. The flap 13, that is to say the front flap 3 and rear flap 4 may, for example, be metal plates or fiber reinforced composite material plates that are each substantially stiff or rigid and formed with the required curvature (for the front flap 3) or the required flat planarity (for the rear flap 4). These flaps may be slightly flexible but in any event stiff enough to be self-supporting and to maintain the respective initial curved or planar shape thereof.

The overall arrangement further includes an actuating mechanism that comprises an actuator 8 and/or a spring 8B connected through a transmission arrangement or actuating linkage 8A to the ram air inlet flap 13 for moving the flap 13 selectively into different positions. The transmission arrangement or linkage 8A may be a mechanical transmission arrangement such as a rack and pinion arrangement, a threaded screw or spindle with a threaded follower nut, a rod linkage, a push-pull cable linkage (e.g. a Bowden cable), or the like. In any event, the transmission or linkage 8A transmits the actuating motion and power from the actuator 8 onto the ram air inlet flap 13 to selectively move the flap 13 so as to close or open or partially open the air intake opening cross-section 14 of the ram air channel 2, as follows.

Figure 1:
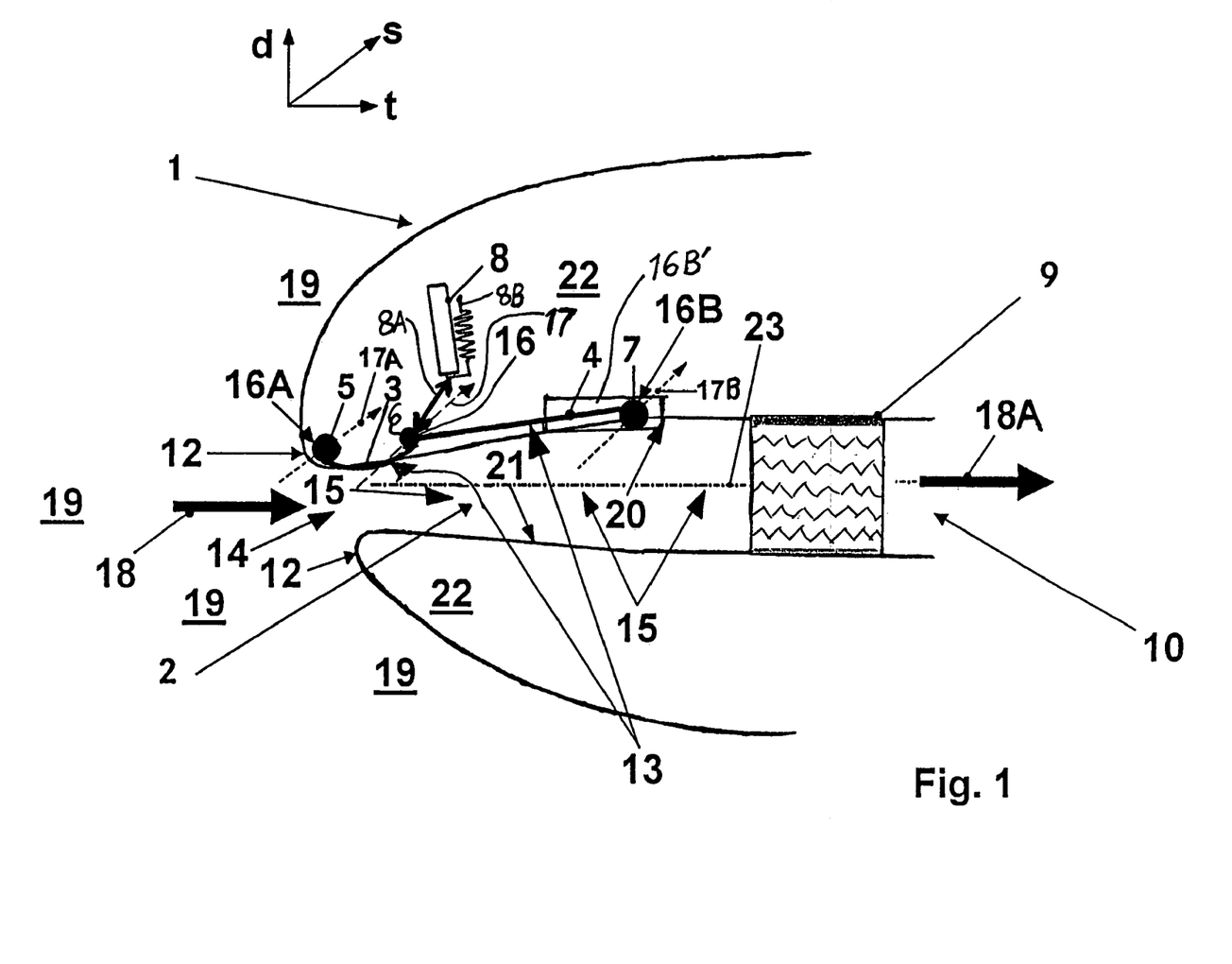
FIG. 1 is a schematic cross sectional view of a ram air inlet arrangement according to the invention, including an air intake opening in the leading edge of a lifting wing, and a flap arrangement including two flaps and an actuating mechanism in an open position in the air inlet channel.

In this regard, the ram air inlet flap 13 can take on a fully opened position as shown in FIG. 1, in which the flap 13 is retracted fully against the channel ceiling 20, or is retracted into a recess or cavity for this purpose in the channel ceiling 20, or is pulled upwardly through an opening in the channel ceiling 20, so that the flap 13 effectively forms this flush area of the channel ceiling 20. As can be seen in FIG. 1, in this fully open position, the flap 13 does not or does not significantly block or constrict the air intake opening cross-section 14, so that a full flow of the ram air 18 into the ram air channel 2 and then further through the heat exchanger 9 is permitted.

Figure 2:
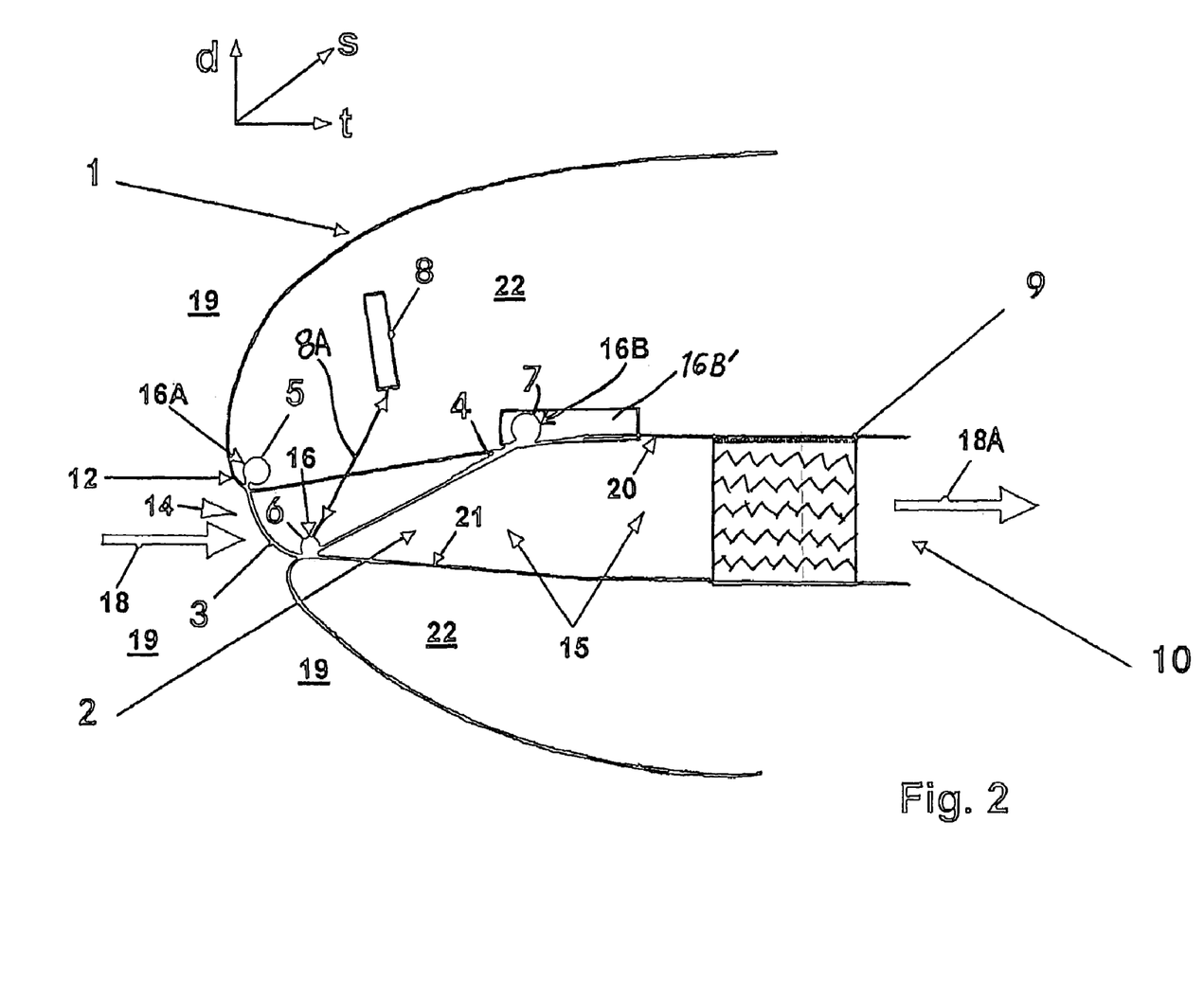
FIG. 2 is a schematic sectional view similar to FIG. 1, but with the flap arrangement in a closed position in which the air intake opening is closed by the front flap.

Alternatively, the flap 13 can be driven by the actuator 8 to the fully closed position shown in FIG. 2. In this position, the front flap 3 has completely (or substantially) closed and blocked the air intake opening cross section 14, so that (substantially) no ram air 18 flows into the ram air channel 2. Namely, the front flap 3, in this closed position, spans the opening cross section 14 between the channel ceiling 20 and the channel floor 21, whereby the lower and rear edge of the front flap 3 is pressed against the forward edge of the channel floor 21, so as to close the air intake opening. It should be understood that the closed position does not require a complete air tight seal of the air inlet opening cross-section, but may allow some insignificant air leakage or a mandatory minimum airflow (e.g. to prevent overheating of the heat exchanger 9) therethrough into the ram air channel 2.

Figure 3:
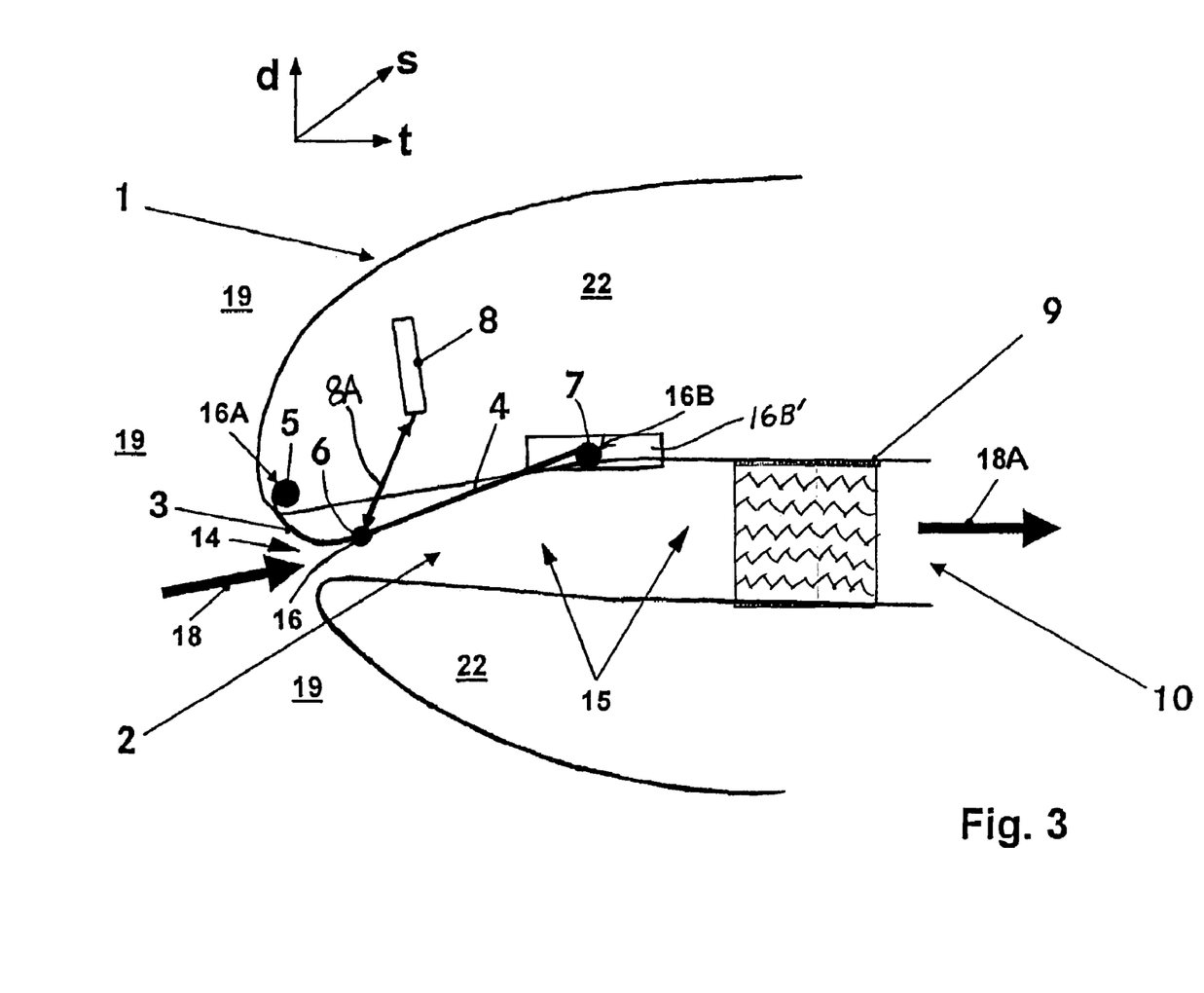
FIG. 3 is a schematic sectional view similar to FIG. 1, but showing a partially opened position, in which the cross-section in the air inlet channel is partially closed or constricted by the flap arrangement.

In this regard, it is advantageous that the front flap 3 has a convex curvature, with the convexity oriented downward and outward, as can be seen in FIGS. 1, 2 and 3. Particularly, this convex curvature of the front flap 3 matches the curvature of the cross-sectional outer contour of the leading edge 12 of the lifting wing 1 at this location of the air intake opening cross-section 14. In this regard, the curvature of the flap 3 "matching" the curvature of the wing leading edge 12 means "matching" sufficiently so that there is no disruption or only an insignificant disruption of the overall aerodynamics of the wing. Thus, in the closed position shown in FIG. 2, the front flap 3 effectively closes and completes the outer contour of the wing leading edge 12, so that there is no significant disruption of the ram air 18 or the outside ambient air 19 as it flows in its normal flow pattern as a boundary layer or layers over the leading edge 12 of the wing 1, without suffering significantly increased separation or turbulence. Thereby, the total air resistance, e.g. the coefficient of drag, of the aircraft is not significantly increased by the provision of the ram air inlet and flap arrangement in the leading edge of the wing. In contrast to the shape of the front flap 3, the rear flap 4 may conveniently or simply have a flat planar shape without curvature.

FIG. 3 shows a further possible position of the flap 13, namely a partially open position. In this partially open position, the curved front flap 3 and the straight or planar rear flap 4 together form a smooth constriction in the form of a nozzle throat, having a variable opening depending on the particular selected position of the inlet flap 13. Thereby, the flow velocity and the mass flow throughput of the ram air 18, flowing through the ram air channel 2 as cooling air to the heat exchanger 9, can be effectively controlled. This nozzle configuration can also serve to increase the total cooling air mass flow, which means that the cooling capacity of the air conditioning system can be increased, so that correspondingly the system weight of the air conditioning system and the dimensions of the ram air channel can be reduced, which also can lead to weight savings.

In any such intermediate or partially open position, the convexly curved front flap 3 forms the inwardly curving convergent inlet of the ram air channel 2, while the adjoining rear flap 4 forms the divergent or expanding portion of the achieved nozzle configuration. Excess ram air 18 is effectively diverted away from the inlet opening cross-section 14, to continue in its normal flow pattern over the leading edge 12 of the wing 1.

Each of the above described positions of the ram air inlet flap 13 can be actively selected by appropriate actuation of the actuator 8. Moreover, the flap 13 is securely held in any selected position between the fully open position and the fully closed position, i.e. over a range of partially open positions, for example by the unpowered actuator's resistance against movement. The established position of the flap arrangement 13 can also be held in a self-locking manner, for example due to a purposeful degree of friction in the bearings or in the slide guide track as will be described below. In this regard, the actuator 8 can have any conventionally known construction, arrangement and operation. For example, the actuator 8 may comprise an electrically powered stepper motor, which is preferably regulatable in an infinitely positionable or stepless manner. Alternatively, the actuator 8 may comprise a pneumatic or hydraulic linear actuator such as a piston-cylinder device, or a rotary actuator such as a pneumatic or hydraulic motor. In any event, the transmission or linkage arrangement 8A couples, and if necessary converts, the output drive power of the actuator 8 to a complex motion of the ram air inlet flap 13, for example as a linear actuation while additionally allowing a pivoting motion of the third bearing 16. In other words, it is simply necessary that the actuator 8 and the transmission or linkage 8A can exert a push-pull actuation to the third bearing 16 and/or the connected front flap 3 and rear flap 4, relative to the wing structure 22.

Additionally, or alternatively, a pre-stressed spring 8B can be arranged parallel to the actuator 8 or instead of the actuator 8. This spring 8B (see FIG. 1) has a defined stiffness or spring constant and exerts a defined pre-stress pushing downwardly and outwardly against the flap 13, namely against the front flap 3 and the rear flap 4 or the third bearing 16 connected thereto, to bias the flap from the open position toward the closed position. Particularly, this spring 8B is thus a compression spring that has one end thereof secured and bearing against the wing structure 22, and the other end thereof exerting a spring pressing force against the third bearing 16 of the flap 13. In this manner, the spring force of the spring 8B acts against the force of the ram air 18 pressing on the flap 13, and especially the front flap 3. Thus, if the spring 8B is used without the actuator 8, the flap 13 will exhibit a self-regulated operation to open or close the ram air inlet depending on the prevailing ram air pressure. On the other hand, if the spring 8B is used together and parallel with the actuator 8, the spring will simply serve to counteract the ram air force, so as to relieve the actuator 8 of this ram air force. In any event, the combination of the actuator 8, the spring 8B, and the transmission and the linkage 8A serve to move the flap 13 to any desired position and hold any such desired position in the range from the fully open position to the fully closed position and any intermediate partially open position.

The particular mechanics and motion of the two flaps, namely the front flap 3 and the rear flap 4 making up the flap 13, as well as the three bearings 16, 16A and 16B, will now be described in further detail in connection with FIGS. 1 to 3.

As mentioned above, the convexly curved front flap 3 and the planar rear flap 4 are pivotably connected to each other by the third bearing 16 at the third pivot point 6, i.e. to allow the two flaps 3 and 4 to pivot relative to each other about the third bearing axis 17 extending substantially in the wing span s direction. This third bearing 16 is freely movable in the wing chord or depth t direction and in the wing height or thickness d direction. This can be seen by comparing the positions of the bearing 16 in the open position according to FIG. 1, the closed position according to FIG. 2, and the partially opened position according to FIG. 3.

On the other hand, the first bearing 16A is a fixed bearing, namely a rotational pivot bearing that is fixedly connected to the wing structure 22 at a fixed position near the ram air inlet opening cross section 14, i.e. at the area of the leading edge 12 within the wing structure 22. The forward and upper edge of the front flap 3 is connected to the first bearing 16A so as to be pivotable about the first pivot point 5 established by this bearing, i.e. about the first bearing axis 17A extending substantially in the wing span s direction. Thus, the front flap 3 is enabled to pivot about this axis 17A between the open position shown in FIG. 1 through various intermediate positions as shown in FIG. 3, to the fully closed position as shown in FIG. 2. In connection with such pivoting of the front flap 3 about the first bearing axis 17A, the third bearing 16 moves along a corresponding arc as discussed above.

Meanwhile, the rear flap 4, which is also pivotably connected to the third bearing 16 to be pivotable about the axis 17 relative to the front flap 3, must also move together with or corresponding to the motion of the movable bearing 16. To allow this, the upper and rear edge of the rear flap 4 is connected to the second bearing 16B so as to allow the rear flap 4 to pivot about the second pivot point 7 established by the second bearing 16B, i.e. about the second axis 17B extending substantially in the wing span s direction. Furthermore, the complex motion of the flaps 3 and 4 requires the second bearing 16B to be movable at least in one direction generally along the profile chord 23, i.e. a longitudinal direction of the channel parallel to or generally along the wing chord or depth t direction. For example, the movable second bearing 16B, particularly embodied as a linearly movable bearing, may comprise an axial bearing that is supported in one or more guide tracks 16B' that extend generally parallel to the wing chord or depth t direction. Note that the guide track 16B' can tilt or slope somewhat in the wing height or thickness d direction. Nonetheless, preferably the majority motion component of the motion of the movable second bearing 16B is directed in the longitudinal direction extending longitudinally along the air channel 2, while a lesser motion component may be oriented in the wing thickness or height d direction.

The actuator 8 is connected via the transmission or the linkage 8A to the movable third bearing 16. Thereby, when the actuator 8 and linkage 8A exert a pushing force onto the movable bearing 16, the flap arrangement 13 will be moved from the open position shown in FIG. 1 through the intermediate position shown in FIG. 3 to the closed position shown in FIG. 2. That involves the third bearing 16 moving downwardly toward the channel floor 21 and forwardly toward the inlet opening cross-section 14 of the ram air channel 2, while the front flap 3 pivots downwardly and forwardly about the first bearing axis 17A (in a clockwise direction), and while the rear flap 4 pivots downwardly (in a counterclockwise direction) about the second bearing axis 17B and is simultaneously pulled forward by the motion of the third bearing 16. Thus, the second bearing 16B slides forwardly along the guide tracks 16B'.

In the opposite sense, when the flap arrangement 13 is to be moved from the closed position of FIG. 2 to the intermediate position of FIG. 3 or the open position of FIG. 1, the actuator 8 through the linkage 8A exerts a pulling force onto the third bearing 16. This causes the bearing 16 to pivot upwardly with the front flap 3 (in a counterclockwise direction) about the first bearing axis 17A, while the bearing 16 moves upwardly and rearwardly. As a consequence, the rear flap 4 connected to the third bearing 16 is also pivoted upwardly (in a clockwise direction) about the second bearing 16B, while the second bearing 16B is additionally pushed rearwardly and thus caused to slide along the guide tracks 18B' in a direction away from the channel intake opening 14.

In this regard, the particular length of the front flap 3 between the bearings 16A and 16, and of the rear flap 4 between the bearings 16 and 16B, relative to each other and relative to the length and height of the inlet throat of the ram air channel can be designed and selected as necessary to achieve and optimize the required opening and closing motion pattern of the flap arrangement. As mentioned above, the front flap 3 has a convex curvature preferably matching the outer contour curvature of the leading edge 12 of the wing 1, while the rear flap 4 is substantially flat or planar. The curved contour of the front flap 3 is preferably a circular arc contour for simplicity, or can be more exactly matched to the geometry of the leading edge of the wing. These curvatures can also be specially adapted to optimize the nozzle effect achieved by the flap arrangement in the partially open positions. The most important factor is simply that the front flap 3 must pivot downwardly to close the air intake opening cross section 14 as shown in FIG. 2.

Moreover, while the embodiment shown in the present drawings involves the actuating mechanism arranged in the wing structure 22 above the ram air channel 2, and the flap arrangement 13 also arranged above and extending downwardly into the channel 2 for closing the channel, either or both of these aspects could be reversed. Namely, the actuating mechanism 8, 8A, 8B and or the flap arrangement 13 could be mounted at the bottom side of the channel 2 rather than at the top side of the channel 2.

Preferably to achieve the desired motion pattern, the extended flap length of the front flap 3 is less than or equal to the extended flap length of the rear flap 4. As mentioned above, the flaps in the open position may be retracted flush with or above the actual plane of the channel ceiling 20, for which purpose there must be a recess or an opening provided in the channel ceiling 20 into which or through which the flaps 3 and 4 as well as the third bearing 16 can freely move.

Figure 4:
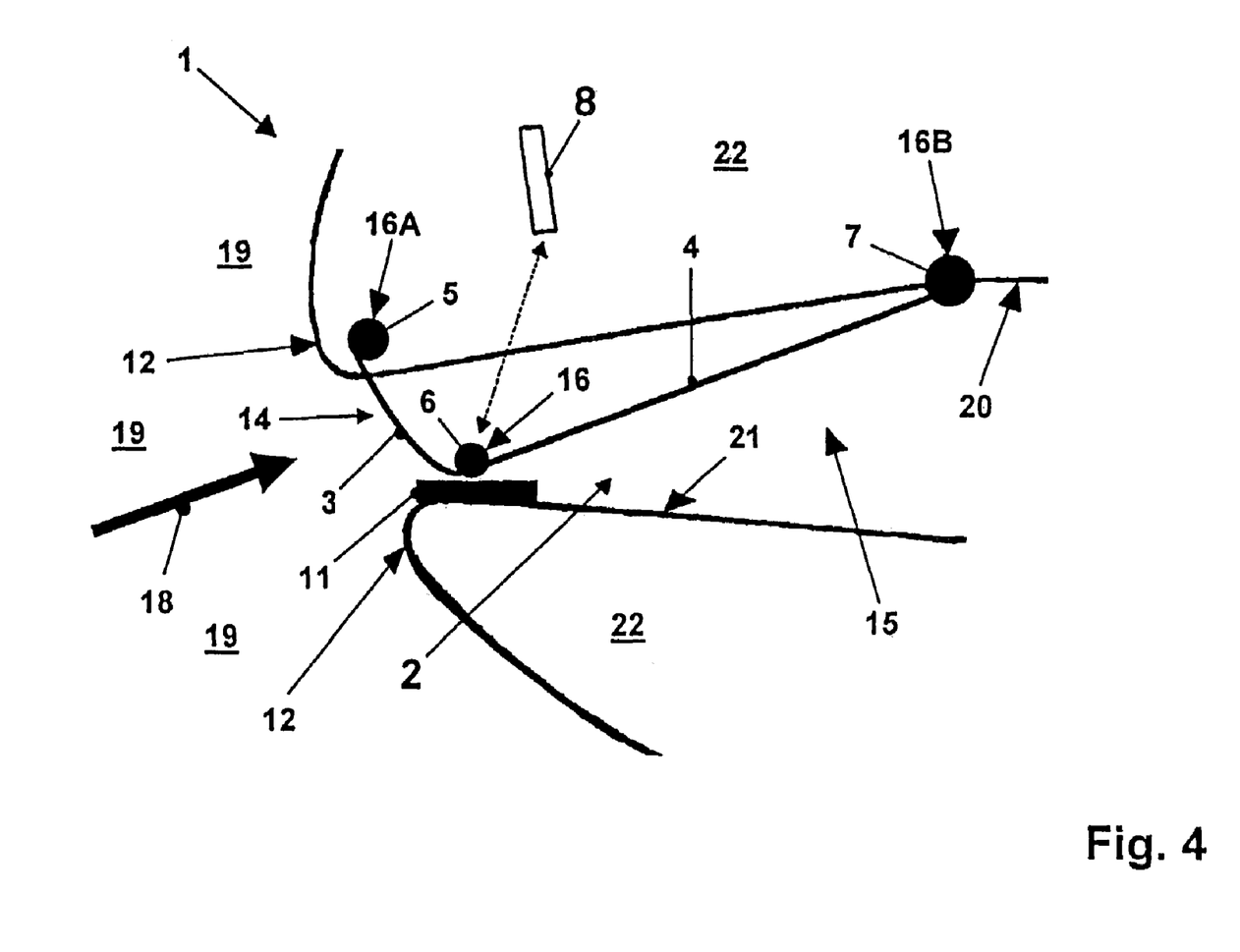
FIG. 4 is a schematic sectional view similar to that of FIG. 2, in an almost-closed position of the flap arrangement, additionally including a contact stop plate structurally strengthening the floor of the channel.

FIG. 4 shows a further feature of the invention, generally in connection with the embodiment discussed above with reference to FIGS. 1 to 3. In other words, the embodiment of FIG. 4 corresponds to that of FIGS. 1 to 3, except for the additional feature of a mechanical contact stop 11 such as a contact stop plate 11 that serves to structurally strengthen the channel floor 21 near its end adjoining the wing leading edge 12. This contact stop plate 11 serves to avoid or reduce the possibility of wear and/or pressing damage of the channel floor 21 due to the repeating pressing of the front inlet flap 3 and/or the movable third bearing 16 against the floor 21. Namely, in this embodiment, the closure of the air intake opening cross-section 14 is achieved by the pressing of the front flap 3 and/or the bearing 16 against the contact stop plate 11 rather than directly against the channel floor 21. The contact stop plate 11 can be easily replaced whenever necessary, for example at routine maintenance or service intervals.

Also, the surface of the contact stop plate 11 can be configured and/or constructed to achieve an improved seal relative to the front flap 3 and/or the bearing 16. Alternatively, the contact stop plate 11 can purposely prevent a complete closure of the air intake opening cross-section 14. For example, the contact stop plate 11 may have slots or grooves extending therein in the wing chord direction, to allow at least a defined minimum flow of ram air 18 into the channel 2 even when the front flap 3 and/or the bearing 16 is pressed against the contact stop plate 11. The contact stop may alternatively be arranged as several individual plates 11 spaced apart from one another on the channel floor 21 in the wing span s direction, so as to leave the minimum airflow opening at the spaces between the successive plates 11 in the wing span s direction. This guaranteed minimum flow of ram air 18 through the channel 2 to the heat exchanger 9 avoids unintended overheating of the heat exchanger 9, which could lead to a malfunction or shutdown of the air conditioning system.

Figure 5:
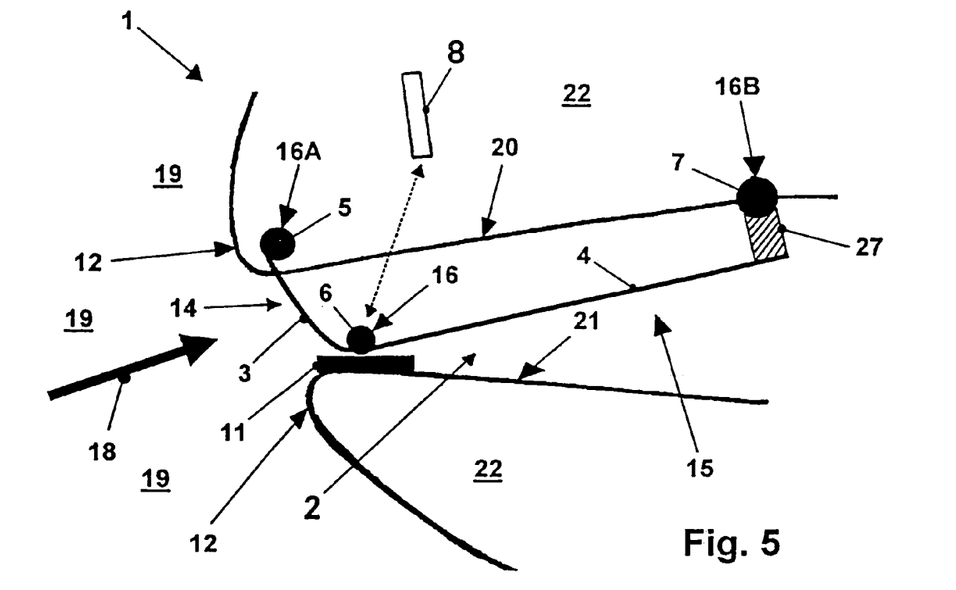
FIG. 5 is a schematic sectional view similar to FIG. 4, but showing an alternative embodiment of the flap arrangement that is supplemented by a mounting lever arrangement.

A modified embodiment of the ram air intake arrangement of FIG. 4 is shown schematically in FIG. 5. This embodiment of FIG. 5 generally corresponds to the features of the embodiments of FIGS. 1 to 4, except that the second bearing 16B, instead of being a linearly movable bearing, is now a fixed bearing that is secured at a fixed location relative to the wing structure 22. Further; in this regard, a pivotable lever 27 is pivotably connected to the fixed second bearing 16B, and the opposite free end of this lever 27 is secured substantially perpendicularly (e.g. at 80 to 100°) to the rear and upper end of the rear inlet flap 4, i.e. at the end thereof opposite the end connected to the third bearing 16.

Thereby, the lever-mounting of the upper rear end of the rear flap 4 via the lever 27 is carried out to allow a flexing or kinking. This permits a displacement of the rear flap 4 in the wing chord and/or wing thickness directions, to permit the pivoting motion of the third bearing 16 along with the front flap 3 about the pivot axis of the first bearing 16A. While the front flap 3 and the third bearing 16 pivot up and back from the closed position to the open position, the rear flap 4 is also pushed back and up via the flexing or kinking connection through the lever 27 to the fixed second bearing 16B.

With this arrangement, however, it will not be possible to achieve the totally flush or recessed open position of the flap arrangement 13 as shown in FIG. 1, but instead the flap arrangement 13 will always protrude somewhat into the cross-sectional area of the ram air channel 2. This merely needs to be taken into account when designing the dimensions for the required ram air flow volume and velocity. In any event, this mounting or support of the rear upper end of the rear flap 4 via a flexible or kinkable lever 27 and the fixed pivot bearing 16B represents another embodiment of the pivotable and movable mounting or support at this end of the rear flap 4, instead of the linearly slidable pivot bearing 16B of the embodiment of FIGS. 1 to 3. Namely, even with the fixed-position bearing 16B in FIG. 5, the interposed flexible or kinkable lever 27 provides the required additional degree of mobility in one or more directions.

Figure 6:
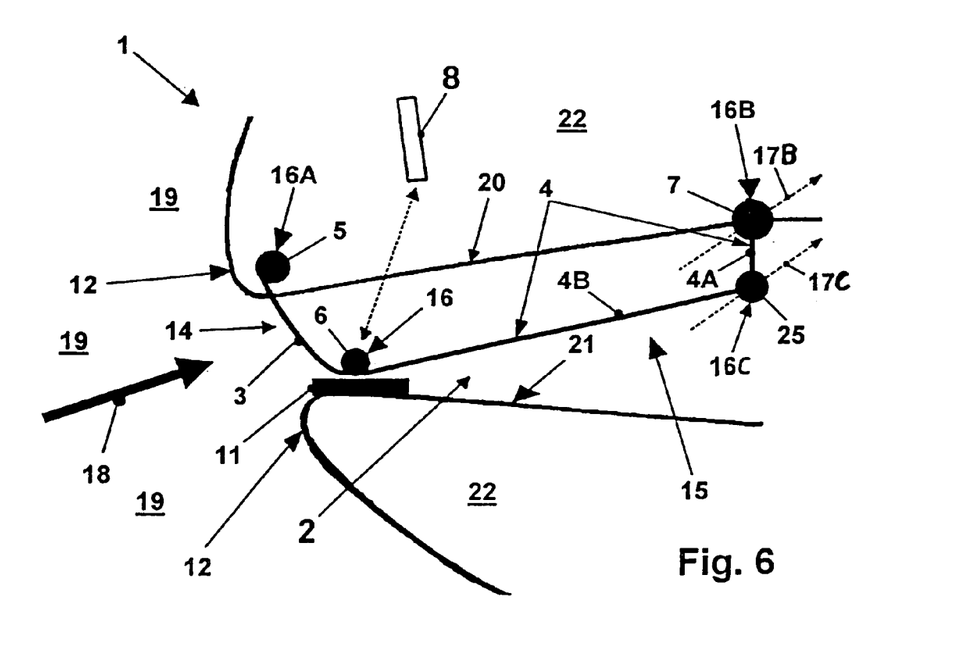
FIG. 6 is a schematic sectional view similar to FIG. 4, but showing a further alternative embodiment of the flap arrangement in which the rear flap is made up of two flap members interconnected by a movable pivot bearing.

FIG. 6 shows a further modified or varied embodiment of a pivotable and movable mounting arrangement for the rear end of the rear flap 4. This embodiment of FIG. 6 looks somewhat similar to the embodiment of FIG. 5, and is also generally similar to the embodiment of FIGS. 1 to 3 as well as the embodiment of FIG. 4. Instead of the linearly slidable mounting of the second bearing 16B in FIG. 1, the embodiment of FIG. 6 provides a pivoting support or motion of a fourth bearing 16C as a movable bearing. More particularly, in this embodiment, the rear flap 4 is made up of a first rear flap member 4A and a second rear flap member 4B, which are pivotably connected to each other by the fourth movable bearing 16C, so that the two flap members 4A and 4B are pivotable relative to each other about the pivot bearing axis 17C extending substantially parallel to the wing span s direction. The forward end of the second flap member 4B, i.e. the forward end of the rear flap 4, is connected to the movable third bearing 16 just as described above. The opposite or upper end of the first flap member 4A, i.e. representing the rear and upper end of the rear flap 4, is connected to the second bearing 16B, which here can be embodied as a fixed-position bearing 16B having a fixed position relative to the wing structure 22.

With this arrangement, the first flap member 4A of the rear flap 4 can pivot about the pivot point 7 of the second bearing 16B, i.e. about the pivot axis 17B. Thereby, the fourth bearing 16C can swing or pivot about the second pivot axis 17B, while its fourth pivot axis 17C moves correspondingly in an arc about the second axis 17B, as these two axes 17B and 17C remain parallel to each other. Thereby, the two flap members 4A and 4B of the rear flap 4 will be pivotable relative to one another about the fourth bearing pivot point 25 identifying the location of the fourth pivot axis 17C.

In this embodiment of FIG. 6, the front flap 3 is once again convexly curved, just as in the above described embodiments, while the first flap member 4A and the second flap member 4B together forming the rear flap 4 are each flat or planar and not curved. The flap length of the first and second flap members 4A and 4B differ from one another. For example, the first flap member 4A is shorter than the second flap member 4B, but it may alternatively be of the same length or longer than the second flap member 4B. In any event, the length of the individual flap components must simply be selected or designed to achieve the required motion pattern of the overall flap arrangement.

With this arrangement, when the third bearing 16 is pulled up by the actuator 8 to move the flap arrangement to the open position, the first flap member 4A of the rear flap 4 can be pivoted rearwardly and upwardly to lie flush against or recessed into the channel ceiling 20, while the second flap member 4B of the rear flap 4 lies against and overlaps the first flap member 4A, to also extend flushly along or recessed into the channel ceiling 20 in the maximum open position. In this manner, the front flap 3 and the second flap member 4B of the rear flap 4 will together form a portion of the channel ceiling 20. If a recess or opening is provided in the channel ceiling 20, then this recess or opening is large enough to allow the second bearing 16B and the fourth bearing 16C together with the flap components to be recessed into or above the channel ceiling.

Various different actuating mechanisms can be used instead of the above described preferred example embodiment that acts on the third bearing 16 with a push-pull actuation in a direction transverse relative to the longitudinal direction of the air channel 2. For example, a push-pull actuation in the longitudinal direction of the channel can be applied to the movable second bearing 16B. As a further example, a rotary actuation can be applied to the shaft of the front flap 3 in the first bearing 16A.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a ram air channel, a ram air intake opening at an upstream end of said channel, and a flap arrangement that is arranged in said upstream end of said channel and that is selectively movable between a closed position and an open position to selectively relatively close or open said intake opening,
an improvement wherein:
said ram air intake opening is located in a leading edge of a lifting wing of said aircraft;
said ram air channel extends rearwardly from said intake opening within said lifting wing along or substantially parallel to a wing profile chord of said lifting wing;
said flap arrangement comprises at least one flap pivotably supported by plural separate pivot bearings having respective non-coincident plural pivot axes extending in a wing span direction of said lifting wing;
said improvement further comprises an actuating mechanism connected to said flap arrangement and adapted to actuate and move said flap arrangement selectively to and between said closed position and said open position;
said at least one flap comprises a front flap having opposite first and second flap ends; and
said front flap has a sectional convex curvature that curves convexly outwardly from said ram air channel at said ram air intake opening and that matches a sectional wing curvature of an outer contour of said leading edge of said lifting wing adjoining said ram air intake opening when said front flap is in said closed position.

2. The improvement in the aircraft according to claim 1, further comprising an outlet air channel with a downstream end ending at an outlet opening communicating to an outside environment outside of said aircraft, and a ram air heat exchanger interposed and connected between said ram air channel and said outlet air channel.

3. The improvement in the aircraft according to claim 1, wherein said ram air intake opening is located at a location of maximum ram air pressure on said leading edge of said lifting wing.

4. The improvement in the aircraft according to claim 1, wherein:
said at least one flap further comprises a rear flap having opposite third and fourth flap ends;
said pivot bearings include a fixed-position bearing that pivotably connects said first end of said front flap to a wing structure of said wing adjacent to said ram air intake opening, and a movable bearing that pivotably connects said second end of said front flap to said third end of said rear flap; and
in said closed position, said front flap spans and at least substantially closes said ram air intake opening leaving no more than a defined mandatory minimum airflow cross-section open.

5. The improvement in the aircraft according to claim 4, wherein said pivot bearings further include a constrained movable bearing which is linearly movably or arcuately swingably connected to said wing structure adjacent to said ram air channel and to which said fourth end of said rear flap is connected so as to be pivotable about a pivot axis of said constrained movable bearing.

6. The improvement in the aircraft according to claim 4, wherein said pivot bearings further include another fixed-position bearing connected at a fixed position to said wing structure adjacent to said ram air channel; and
wherein said flap arrangement further comprises a lever that flexibly or kinkably connects said fourth end of said rear flap to said another fixed-position bearing so that said fourth end is pivotable about and shiftable relative to a pivot axis of said another fixed-position bearing.

7. The improvement in the aircraft according to claim 4, wherein said rear flap has a non-curved planar shape and a different length between said third and fourth ends than said front flap has between said first and second ends.

8. The improvement in the aircraft according to claim 4, wherein said front flap and said rear flap together form a nozzle throat constriction in said ram air channel in plural intermediate positions between said closed position and said open position.

9. The improvement in the aircraft according to claim 1, wherein said at least one flap further comprises a rear flap, wherein said front flap and said rear flap are connected to each other and arranged movably one behind the other in a downstream direction in said upstream end of said ram air channel, and wherein said plural separate pivot bearings pivotably support said front and rear flaps relative to an aircraft structure of said aircraft adjoining or bounding said ram air channel.

10. The improvement in the aircraft according to claim 9, wherein said plural separate pivot bearings include a first bearing, a second bearing and a third bearing.

11. The improvement in the aircraft according to claim 10, wherein said first bearing is a fixed bearing that is secured to said aircraft structure at a fixed position, said third bearing is a movable bearing that is movable relative to said aircraft structure, and said second bearing is either fixed in position or movable relative to said aircraft structure.

12. The improvement in the aircraft according to claim 11, wherein said front flap is connected to said first bearing and said third bearing, said rear flap is connected to said second bearing and said third bearing, and among said bearings said first bearing is closest to said ram air intake opening, said second bearing is farthest from said ram air intake opening, and said third bearing is between said first and second bearings with respect to a longitudinal direction extending from said ram air intake opening into said ram air channel longitudinally along said ram air channel.

13. The improvement in the aircraft according to claim 12, wherein said rear flap has opposite third and fourth flap ends, said first flap end of said front flap is pivotably connected by said first bearing to said aircraft structure so that said front flap is pivotable relative to said aircraft structure about a fixed first pivot axis of said first bearing, said second flap end of said front flap and said third flap end of said rear flap are pivotably connected to each other by said third bearing so that said front and rear flaps are pivotable relative to each other about a movable third pivot axis of said third bearing that is movable relative to said aircraft structure in at least one of said longitudinal direction and a direction perpendicular thereto, said second bearing is movable at least in said longitudinal direction relative to said aircraft structure, and said fourth flap end of said rear flap is pivotably and movably connected by said second bearing to said aircraft structure so that said rear flap is pivotable about a movable second pivot axis of said second bearing and movable at least in said longitudinal direction relative to said aircraft structure.

14. The improvement in the aircraft according to claim 13, further comprising a linear guide track secured to said aircraft structure, wherein said second bearing is guided by said guide track to be linearly guidedly movable along said guide track in a motion direction having at least a majority motion component in said longitudinal direction.

15. The improvement in the aircraft according to claim 11, wherein said second bearing is movable relative to said aircraft structure at least in a longitudinal direction extending from said ram air intake opening into said ram air channel longitudinally along said ram air channel.

16. The improvement in the aircraft according to claim 11, wherein said pivot bearings further include a fourth bearing, and said rear flap includes first and second rear flap members that are pivotably connected to each other by said fourth bearing.

17. The improvement in the aircraft according to claim 16, wherein said first rear flap member has a first flap length greater than or equal to a second flap length of said second rear flap member.

18. The improvement in the aircraft according to claim 16, wherein said first rear flap member has opposite first and second member ends, said second rear flap member has opposite third and fourth member ends, said second bearing is fixed in position relative to said aircraft structure, said first member end of said first rear flap member is connected to said second bearing so that said first rear flap member is pivotable relative to said aircraft structure about a fixed pivot axis of said second bearing, said second member end of said first rear flap member and said third member end of said second rear flap member are pivotably connected to each other by said fourth bearing so that said first and second flap members are pivotable relative to each other about a movable pivot axis of said fourth bearing that is movable relative to said aircraft structure in at least one of a longitudinal direction extending longitudinally along said ram air channel and a direction perpendicular thereto, and said fourth member end of said second rear flap member is connected to said third bearing so that said second rear flap member is pivotable about a movable pivot axis of said third bearing that is movable in at least one of said longitudinal direction and said direction perpendicular thereto.

19. The improvement in the aircraft according to claim 11, wherein said second bearing is fixed in position relative to said aircraft structure, further comprising a lever interposed and connected between said rear flap and said second bearing so that said lever is pivotable relative to said aircraft structure about a fixed pivot axis of said second bearing and said lever is secured to extend at an angle of 80° to 100° from one end of said rear flap, and wherein an opposite end of said rear flap is connected to said third bearing.

20. The improvement in the aircraft according to claim 19, wherein at least one of said lever and a connection of said lever to said one end of said rear flap is at least one of flexible and kinkable to allow a motion of said rear flap in addition to pivoting.

21. The improvement in the aircraft according to claim 9, wherein said actuating mechanism is a non-powered passive actuating mechanism comprising a pre-stressed spring connected between said aircraft structure and said flap arrangement to exert onto said flap arrangement a biasing force that biases said flap arrangement toward said closed position opposite a ram air force that will be applied to said flap arrangement by ram air when said aircraft is in motion.

22. The improvement in the aircraft according to claim 9, wherein said actuating mechanism comprises a powered actuator connected between said aircraft structure and said flap arrangement to selectively actively drive said flap arrangement between and to said closed position and said open position.

23. The improvement in the aircraft according to claim 22, wherein said actuating mechanism further comprises a compression spring connected parallel to said powered actuator.

24. The improvement in the aircraft according to claim 22, wherein said powered actuator comprises an electric stepper motor.

25. The improvement in the aircraft according to claim 22, wherein said plural separate pivot bearings include a first bearing, a second bearing and a third bearing, said third bearing is movable relative to said aircraft structure and pivotably interconnects said front and rear flaps to one another, and said actuating mechanism further comprises a mechanical transmission arrangement connected directly between said powered actuator and said third bearing.

26. The improvement in the aircraft according to claim 25, wherein said mechanical transmission arrangement is adapted to apply to said third bearing a linear push-pull actuation motion with a major motion component perpendicular to a longitudinal direction extending longitudinally along said ram air channel.

27. The improvement in the aircraft according to claim 9, further comprising a contact stop plate structurally reinforcing a bounding wall of said ram air channel at a side of said channel opposite a first one of said pivot bearings.

28. The improvement in the aircraft according to claim 27, wherein at least one of said front flap and another one of said pivot bearings contact and rest against said contact stop plate in said closed position.

29. The improvement in the aircraft according to claim 9, wherein, in said open position, said front flap and said rear flap together form a channel ceiling bounding a top side of said ram air channel.

30. The improvement in the aircraft according to claim 9, wherein said ram air channel includes a channel ceiling bounding a top side of said ram air channel, said channel ceiling has an opening or a recess therein enabling said front flap and said rear flap to be moved into or through said opening or to be recessed into said recess.

31. The improvement in the aircraft according to claim 1, wherein said ram air channel extends longitudinally in a longitudinal direction downstream from said intake opening in an aircraft structure of said aircraft;
wherein said plural separate pivot bearings comprise a fixed-position pivot joint and a movable-position pivot a joint; and
wherein said front flat is pivotably connected at said first flap end to at least one of said aircraft structure and said channel by said fixed-position pivot joint at one side of said intake opening; and
wherein said at least one flap further comprises a rear flap that has opposite third and fourth flap ends, and that is pivotably connected at said third flap end to said second flap end of said front flap by said movable-position pivot joint, and that is pivotably and movably connected at said fourth flap end to at least one of said aircraft structure and said channel.

32. The improvement in the aircraft according to claim 31, wherein said actuating mechanism is arranged to act on said front and rear flaps, to selectively move said front and rear flaps from said open position in which said front and rear flaps open an airflow cross-section in said channel, to said closed position in which said front and rear flaps close or minimize said airflow cross-section while leaving no more than a required minimum flow opening with said front flap spanning across said intake opening.

33. The improvement in the aircraft according to claim 31, wherein said pivot bearings further comprise another movable-position pivot joint, and said fourth flap end of said rear flap is pivotably and movably connected to said at least one of said aircraft structure and said channel by said another movable-position pivot joint, which is slidable in at least said longitudinal direction relative to said at least one of said aircraft structure and said channel.

34. The improvement in the aircraft according to claim 31, wherein said pivot bearings further comprise another movable-position pivot joint and another fixed-position pivot joint, and said fourth flap end of said rear flap is pivotably and movably connected to said at least one of said aircraft structure and said channel by said another movable-position pivot joint, which is connected by a swing plate to said another fixed-position pivot joint secured to said at least one of said aircraft structure and said channel, so that said another movable-position pivot joint can pivotally swing about said another fixed-position pivot joint.

35. The improvement in the aircraft according to claim 31, wherein said pivot bearings further comprise another fixed position pivot joint, and said fourth flap end of said rear flap is pivotably and movably connected to said at least one of said aircraft structure and said channel by a flexible or kinkable lever connected to said another fixed-position pivot joint secured to said at least one of said aircraft structure and said channel, so that said rear flap can pivot and shift relative to said another fixed-position pivot joint.

* * * * *

UNITED STATES PATENT AND TRADEMARK OFFICE
CERTIFICATE OF CORRECTION

PATENT NO. : 7,222,819 B1
APPLICATION NO. : 10/910260
DATED : May 29, 2007
INVENTOR(S) : Kelnhofer It is certified that error appears in the above-identified patent and that said Letters Patent is hereby corrected as shown below:

In the drawings
Please replace Figs. 1, 2 and 3 with the attached Figs. 1, 2 and 3, with the following corrections:
Fig. 1 insert --19--, to the right of "18A" at the right side of the figure;
Fig. 2 insert --19--, to the right of "18A" at the right side of the figure;
Fig. 3 insert --19--, to the right of "18A" at the right side of the figure.

Column 15,
Line 28, before "joint;", delete "a";
Line 29, after "front", replace "flat" with --flap--.

Signed and Sealed this

Ninth Day of December, 2008

JON W. DUDAS
*Director of the United States Patent and Trademark Office*

Fig. 1

Fig. 2